United States Patent [19]

Hiruta et al.

[11] Patent Number: 5,247,165

[45] Date of Patent: Sep. 21, 1993

[54] DISPLACEMENT DETECTING APPARATUS USING GRADUATED LINEAR SCALE

[75] Inventors: Akitaka Hiruta; Kayoko Taniguchi; Takao Yukawa, all of Kanagawa, Japan

[73] Assignee: Sony Corporation, Tokyo, Japan

[21] Appl. No.: 898,422

[22] Filed: Jun. 15, 1992

[30] Foreign Application Priority Data

Jun. 13, 1991 [JP] Japan ............................ 2-141836
Sep. 26, 1991 [JP] Japan ............................ 2-247712

[51] Int. Cl.⁵ .................................................. G01J 1/20
[52] U.S. Cl. ............................. 250/201.3; 369/44.14
[58] Field of Search ............... 250/201.3, 201.4, 201.5; 356/1, 4; 369/44.14, 44.19, 44.23

[56] References Cited

U.S. PATENT DOCUMENTS 4,148,587  4/1979  Erdmann et al. ............. 250/201.3
4,492,856  1/1985  Kimura ......................... 250/201.3

Primary Examiner—David C. Nelms
Assistant Examiner—Stephone Allen
Attorney, Agent, or Firm—Lewis H. Eslinger; Jay H. Maioli

[57] ABSTRACT

A displacement detecting apparatus comprises a non-contacting sensor for detecting a displacement of a measured surface, a linear scale unitarily attached to the non-contacting sensor through a coupling member, a graduation read-out device for reading out a graduation of the linear scale, an actuator for moving the non-contacting sensor and the linear scale, and a servo control circuit for driving the actuator, wherein the linear scale and the non-contacting sensor are moved by the actuator in unison with each other. Thus, the displacement of the measured surface can be detected with high accuracy.

8 Claims, 7 Drawing Sheets

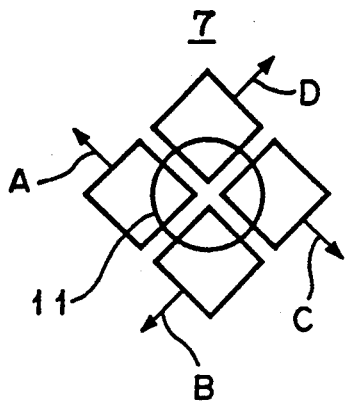 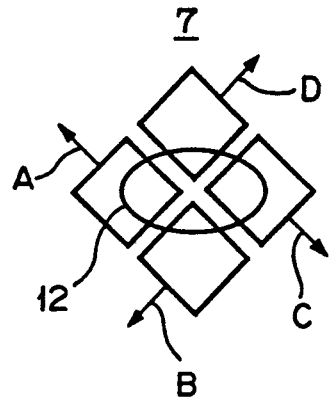 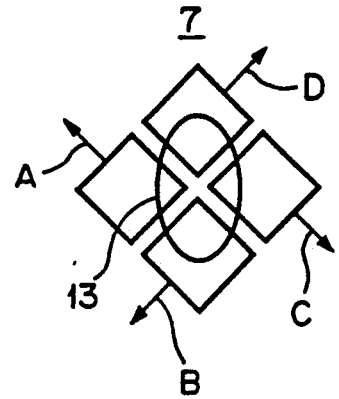
FIG. 2A  FIG. 2B  FIG. 2C
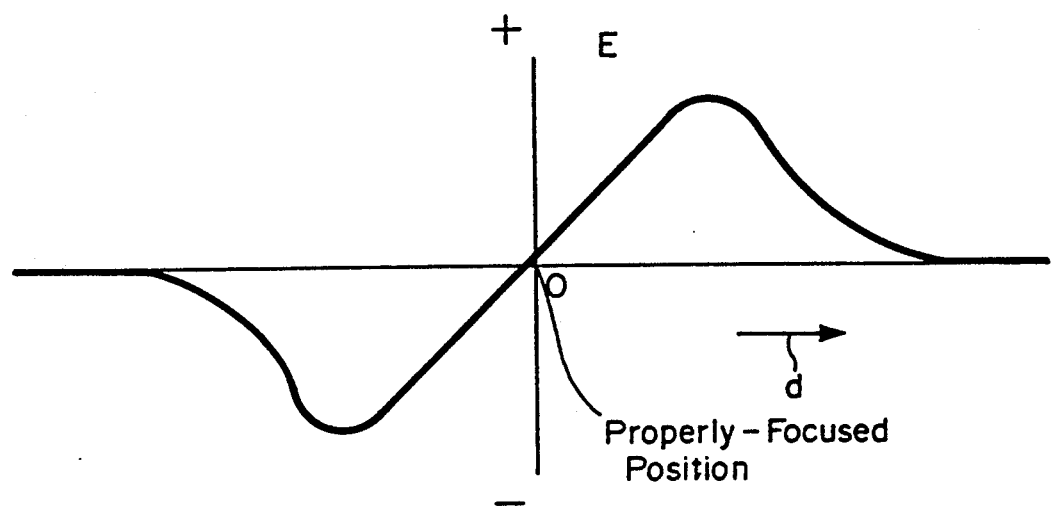
FIG. 3

FIG. 6
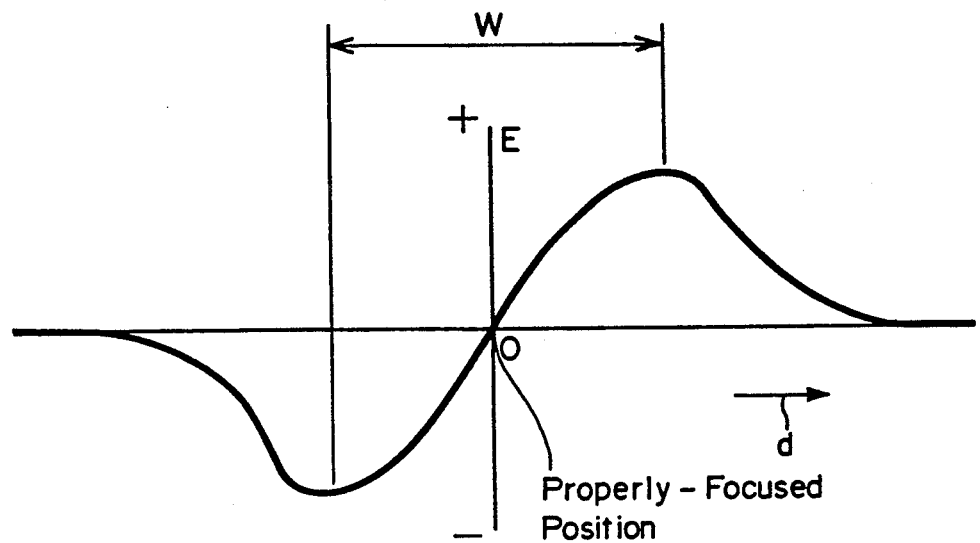
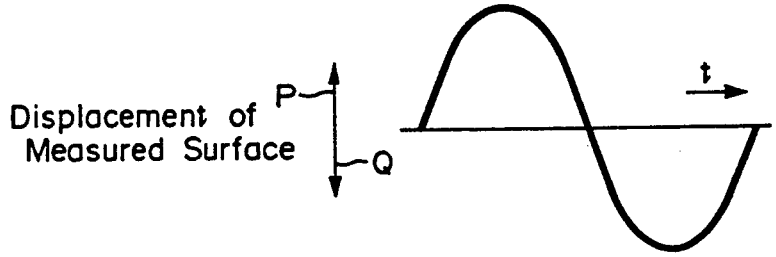
FIG. 7A  Displacement of Measured Surface
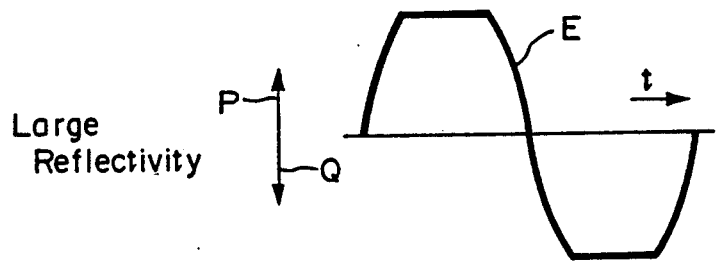
FIG. 7B  Large Reflectivity
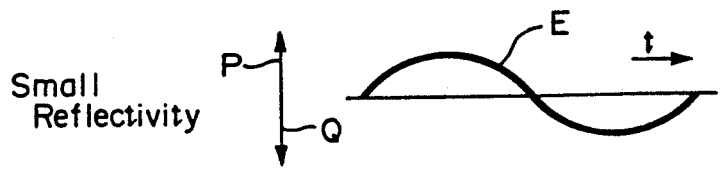
FIG. 7C  Small Reflectivity

DISPLACEMENT DETECTING APPARATUS USING GRADUATED LINEAR SCALE

BACKGROUND OF THE INVENTION

1. Field of the Invention

The present invention generally relates to displacement detecting apparatus and, more particularly, to a displacement detecting apparatus for detecting a displacement between an objective lens and a measured surface by using an optical astigmatism method, for example, and a displacement detecting apparatus for detecting a displacement of a measured surface by using a non-contacting sensor.

2. Description of the Related Art

Displacement detecting apparatus using a laser light, an objective lens or the like are known to measure a displacement or shape of a measured object.

This type of displacement detecting apparatus converges a laser light on a measured surface by an objective lens, obtains a focusing error signal from a reflected light of the laser light on the basis of an astigmatism method and then calculates a displacement of the measured surface from an absolute level (e.g., voltage value) of the focusing error signal.

As other conventional displacement detecting apparatus, there is known a displacement detecting apparatus in which a displacement of a measured surface is detected by using an interferometer or electric micrometer.

In the former conventional displacement detecting apparatus which calculates the displacement of the measured surface from the absolute level of the focusing error signal, a linearity of the focusing error signal itself is insufficient and hence detection accuracy cannot be increased without difficulty. Further, in this type of displacement detecting apparatus, a sensitivity (voltage/displacement) of the focusing error signal is changed with a reflection factor of the measured surface. Then, from this standpoint, it is impossible to increase a measurement accuracy. Furthermore, according to this type of displacement detecting apparatus, a range in which the focusing error signal is detected is small. There is then the disadvantage that a range in which a displacement of the measured surface is detected is unavoidably narrow.

In the latter conventional displacement detecting apparatus which can detect the displacement of the measured surface by using the interferometer or electric micrometer, the measurement work is cumbersome and the apparatus itself is expensive, large in size and low in stability or the like.

Further displacement detecting apparatus having a non-contacting sensor are known to detect a displacement or shape of a measured object.

This type of conventional displacement detecting apparatus effectively utilizes a detection optical system for generating a laser light and a focusing error signal and an objective lens as the non-contacting sensor, converges the laser light on a measured surface by the objective lens, obtains a focusing error signal from the reflected light of the laser light on the basis of the astigmatism method and then detect a displacement of the measured surface from the absolute level (e.g., voltage value) of the focusing error signal.

In the above displacement detecting apparatus for detecting the displacement from the absolute level of the focusing error signal, however, a linearity of the focusing error signal itself is insufficient so that a detection accuracy cannot be increased.

In order to enhance the accuracy with which the displacement is detected, it is proposed that a servo is effected on the displacement detecting apparatus so as to enable the non-contacting sensor to produce an output of a constant value. Then, the movement of the objective lens can be detected by reading a graduation of a linear scale which is designed so as to move in unison with the objective lens.

The above-mentioned displacement detecting apparatus in which the servo is effected to detect the displacement amount of the measured surface is not limited to the above technique which utilizes the detection optical system and a variety of techniques, such as a combination of a non-contacting sensor of a capacitance type and a linear scale, a combination of a scanning tunneling microscope (i.e., STM) and an interferometer or the like may be enumerated.

According to the conventional displacement detecting apparatus in which the detection accuracy can be increased by the servo control, however, because of the servo control, a displacement of a vibration in which a frequency characteristic is relatively low, for example, about 100 Hz can be detected at best. In order to increase the speed of the detection and measurement, the non-contacting sensor must not be servo-controlled and the output level thereof must be measured. If so, then the linearity is deteriorated and the detection accuracy also is lowered. As a result, the above-mentioned problems cannot be solved.

OBJECTS AND SUMMARY OF THE INVENTION

Accordingly, it is an object of the present invention to provide a displacement detecting apparatus in which the aforesaid shortcomings and disadvantages of the prior art can be eliminated.

It is another object of the present invention to provide a displacement detecting apparatus which can detect a displacement amount of a measured surface with high accuracy.

Still another object of the present invention is to provide a displacement detecting apparatus in which a range in which a displacement amount of a measured surface is detected can be expanded.

A further object of the present invention is to provide a displacement detecting apparatus in which a displacement amount can be detected as a displacement amount from a reference position.

Yet a further object of the present invention is to provide a displacement detecting apparatus which can detect a displacement amount of a measured surface with high accuracy and at high speed.

According to an aspect of the present invention, there is provided a displacement detecting apparatus which comprises a non-contacting sensor for detecting a displacement of a measured surface, a linear scale unitarily attached to the non-contacting sensor through a coupling member, a graduation read-out device for reading out a graduation of the linear scale, an actuator for moving the non-contacting sensor and the linear scale, and a servo control circuit for driving the actuator, wherein the linear scale and the non-contacting sensor are moved by the actuator in unison with each other. Thus, the displacement of the measured surface can be detected with high accuracy.

BRIEF DESCRIPTION OF THE DRAWINGS

A better understanding of other objects, features, and advantages of the present invention can be gained from a consideration of the following detailed description of illustrative embodiments thereof, in conjunction with the figures of the accompanying drawings, in which:

FIGS. 2A through 2C are respectively schematic diagrams used to explain action of a quadrant diode which comprises a detection optical system in the example of FIG. 1;

FIG. 3 is a characteristic graph of a focusing error signal, and to which references will be made in explaining operation of the present invention;

FIG. 6 is a characteristic graph of a focusing error signal, and to which references will be made in explaining operation of the displacement detecting apparatus according to a third embodiment of the present invention;

FIGS. 7A, through 7B are diagrams used to explain a relation between a reflectivity of a measured surface and a focusing error signal, respectively;

DETAILED DESCRIPTION OF THE PREFERRED EMBODIMENTS

The present invention will now be described in detail with reference to the drawings.

Figure 1:
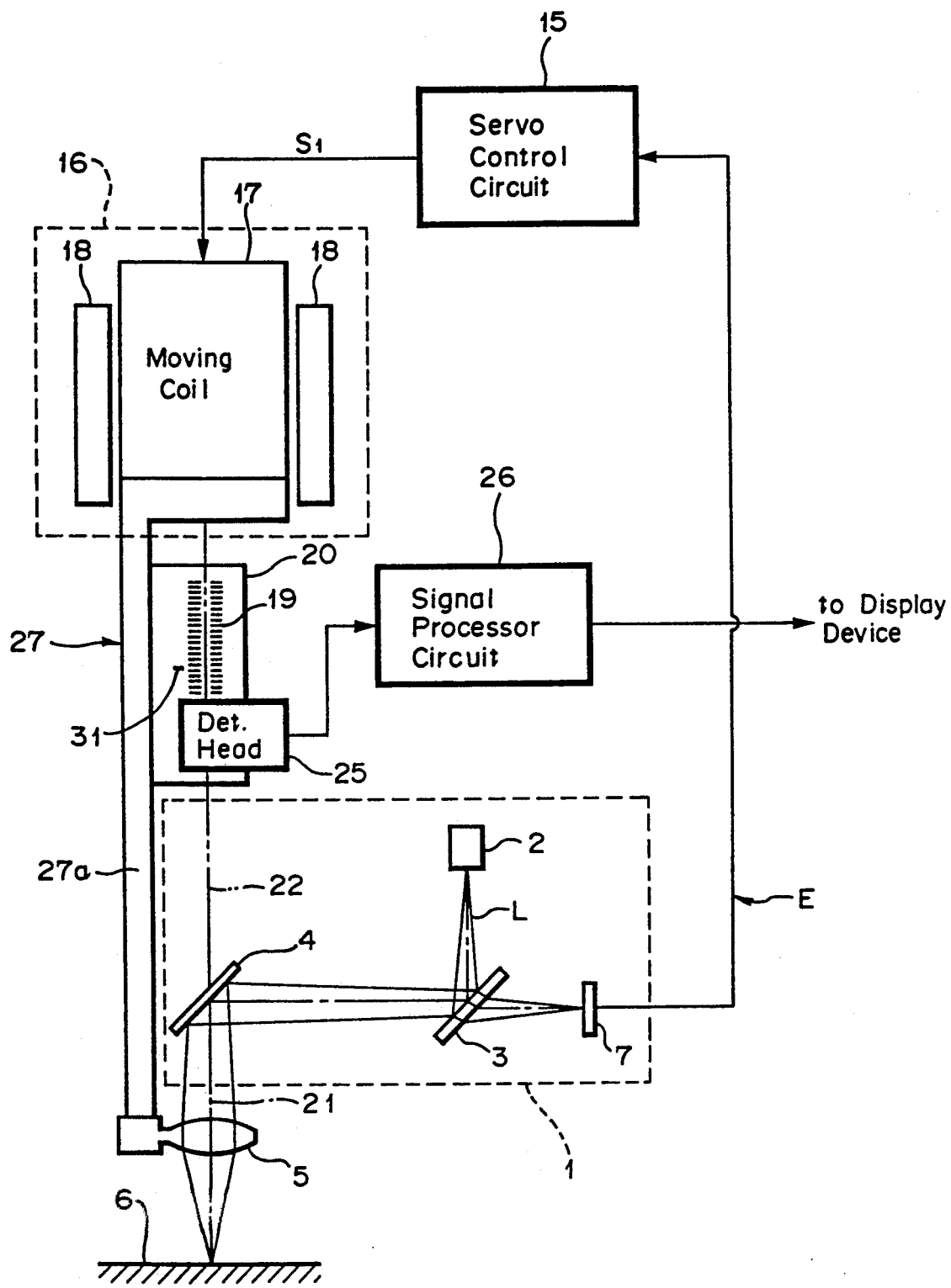
FIG. 1 is a block diagram showing an arrangement of a displacement detecting apparatus according to a first embodiment of the present invention.

FIG. 1 of the accompanying drawings shows in block form an entire arrangement of a displacement detecting apparatus according to a first embodiment of the present invention.

Referring to FIG. 1, there is shown a focusing error detection optical system 1 which includes a laser diode 2. A laser light L emitted from the laser diode 2 is reflected by a beam splitter 3 and further reflected by a mirror 4, thereby the reflected laser light being introduced into an objective lens 5 having a focal length f1.

The incident laser beam L is converged on a measured surface 6, and a reflected light on the measured surface 6 is reflected on the mirror 4, traveled through the beam splitter 3 and then converged again on a quadrant diode 7 that is provided as a photo-detector.

As shown in FIGS. 2A to 2C, the quadrant diode 7 has four divided detecting diodes. When the measured surface 6 is placed at the focusing position f1 of the objective lens 5, then a converged light on the quadrant diode 7 is presented as a circular light spot 11 as shown in FIG. 2A. When the objective lens 5 is moved away from the measured surface 6 than the focusing position f1, the converged light is presented as an elliptic light spot 12 which is extended in the horizontal direction as shown in FIG. 2B. Further, when the objective lens 5 is moved near the measured surface than the focusing position f1, the converged light spot is presented as an elliptic beam spot 12 which is extended in the longitudinal direction as shown in FIG. 2C.

Thus, when the output signals of the divided diodes are respectively represented by A, B, C and D, then an output signal (hereinafter referred to as a focusing error signal) E is generated from the quadrant diode 7 as is given by the following equation (1):

$$E = (A+C) - (B+D) \tag{1}$$

A characteristic of the focusing error signal E is illustrated in FIG. 3.

In the characteristic shown in FIG. 3, an origin O represents a properly-focused position. Assuming that d is a distance between the objective lens 5 and the measured surface 6, then the focal length f1 and the distance d become equal to each other at the origin position O.

Referring back to FIG. 1, the focusing error signal E having the above-mentioned characteristic is supplied to a servo control circuit 15. The servo control circuit 15 includes a comparator circuit and a servo amplifier, though not shown, and supplies an actuator 16 with a drive signal S1 by which the focusing error signal E becomes zero. The actuator 16 includes a movable coil 17, a permanent magnet 18 and a coupling member 27 of a rod-configuration. One end portion of the movable coil 17 is fixed to one end portion of the coupling member 27 and the objective lens 5 is secured to the other end portion of the coupling member 27.

A linear scale 20 having a graduation 19 is secured to the coupling member 27 at its predetermined position. The graduation 19 of the linear scale 20 is coincident with an extension line 22 of an optical axis 21 of the objective lens 5. In other words, the linear scale 20 is disposed in line with (or on the same line as) the optical axis 21 of the objective lens 5. The linear scale 20 might be an optical scale wherein interference fringes are recorded as the graduation 19. Further, the optical scale might be replaced with a magnetic scale or capacitance type scale.

The graduation 19 of the linear scale 20 is read by a detection head 25 secured to a chassis (not shown) or the like. An output signal from the detecting head 25 is supplied through a signal processing circuit 26 to a display device or data logger (not shown).

In this case, since the servo control circuit 15 supplies the movable coil 17 forming the actuator 16 with the drive signal S1 which cancels the focusing error signal E, the distance d between the objective lens 5 unitarily attached to the moving coil 17 and the coupling member 27 and the measured surface 6 is controlled so as to become constantly equal to the focal length f1 of the objective lens 5 in a feedback fashion.

Thus, when the measured surface 6 is displaced, the objective lens 5 and the linear scale 20 are displaced together in the same direction by the same distance so as to hold the focal length f1, whereby this displacement amount can be detected from the graduation 19 of the linear scale 20 by the detection head 25. Then, the signal processor circuit 26 can calculate the displacement amount of the measured surface 6 on the basis of the output signal from the detection head 25. Since the calculated displacement amount can be displayed on the display device (not shown) or recorded in the data logger (not shown), the automatic measurement becomes possible with ease. Since the interpolation processing is carried out by the signal processor circuit 26, the displacement amount can be measured with high resolution.

An Abbe error does not occur in the thus calculated displacement amount because the linear scale 20, which is designed so as to move in unison with the objective lens 5, is coaxially provided on the optical axis 21 of the objective lens 5, i.e., disposed in line with the optical axis 21 of the objective lens 5. As a result, the displacement amount of the linear scale 20 and the displacement amount of the objective lens 5 corresponds to each other in a one-to-one fashion so that the displacement amount can be detected with a considerably high accuracy.

Also, if a displacement falls within a detection range (within the full scale of the graduation 19) of the linear scale 20, a wide detection range can be obtained without deteriorating a detection accuracy.

Further, the feedback control is effected so that, even when the sensitivity of the focusing error signal is changed by the reflectivity on the measured surface, no error occurs in the measurement. Also, the fluctuation of the servo system and the actuator 16 and the drift do not cause an error and hence, the adjustment and calibration can be omitted. Therefore, the stable detection can be carried out over a long period of time.

In the first embodiment of FIG. 1, since the voice coil motor is employed as the actuator 16, a satisfactory linearity relative to the displacement of the measured surface 6 can be obtained because the voice coil motor is linearly displaced relative to the current supplied to the moving coil 17. Accordingly, the displacement amount can be detected with ease by measuring the current supplied to the moving coil 17. Incidentally, the actuator 16 is not limited to the voice coil motor and may be replaced with a DC servo motor, a stepping motor or a piezoelectric element and so on.

While the astigmatism method is effectively utilized in order to obtain the focusing error signal E in the first embodiment of FIG. 1, the present invention is not limited thereto and may be replaced with a critical angle method, a knife edge method or the like. In any methods, since the displacement detecting apparatus is controlled so as to make the focusing error signal E zero, the displacement can be detected with high accuracy regardless of the change of the reflectivity on the measured surface 6.

Further, the detection optical system 1 may be attached to the coupling member 27 so that it can be moved in unison with the objective lens 5 or may be fixed to a chassis (not shown). If the detection optical system 1 is arranged so as to become movable in unison with the objective lens 5, then the detection range of the displacement amount can be expanded to the full scale of the linear scale 20. If the detection optical system 1 is fixed to the chassis, or the detection optical system 1 is arranged as a separation type, then the actuator 16 can be miniaturized comparatively and the weight of the displacement detection apparatus body including the objective lens 5 or the like can be reduced, whereby the displacement amount can be detected at higher speed.

Furthermore, an origin 31 is formed on the linear scale 20 and there is then the advantage that the displacement amount can be detected with reference to the position of the origin 31.

Figure 4:
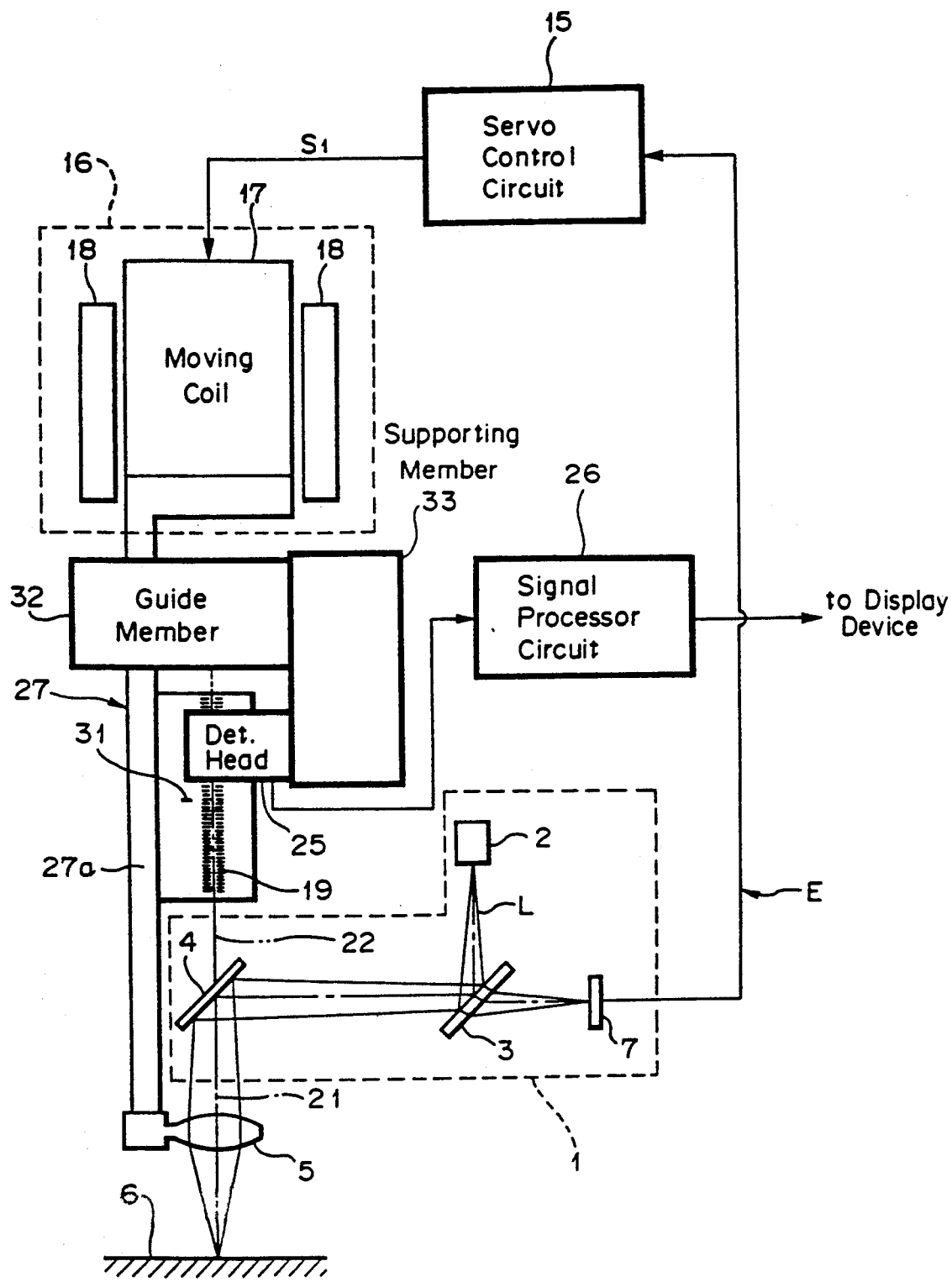
FIG. 4 is a block diagram showing an arrangement of the displacement detecting apparatus according to a second embodiment of the present invention.

FIG. 4 shows an arrangement of the displacement detection apparatus according to a second embodiment of the present invention. In FIG. 4, like parts corresponding to those of FIG. 1 are marked with the same references and therefore need not be described in detail.

As shown in the second embodiment of FIG. 4, a guide member 32 is loosely fitted into a rod-shaped portion 27a of the coupling member 27 (i.e., the rod-shaped portion 27a penetrates the guide member 32). It is preferable that the guide member 32 is disposed on the rear side of the linear scale 20 along the extension 22 of the optical axis 21 of the objective lens 5 in order to improve a running accuracy. The guide member 32 is attached to a supporting member 33 together with the detection head 25, and the supporting member 33 is secured to a chassis (not shown).

If the guide member 32 is provided as described above, there are then the advantages such that the running accuracy of the coupling member 27 can be increased and that the reading accuracy of the detection head 25 relative to the linear scale 20 can be improved. In this case, a contact type guide mechanism such as a bearing or the like may be employed as the guide mechanism of the guide member 32. If a non-contact type guide mechanism in which the guide member 32 is floated by means of a magnet or air slide is employed as the guide mechanism of the guide member 32, then it is possible to construct a displacement detection apparatus of higher accuracy.

As described above, according to the first embodiment of the present invention, the displacement of the distance between the objective lens and the measured surface from the focal length is detected by the detection optical system on the basis of the reflected light reflected on the measured surface, and the objective lens is moved in the optical axis direction by the actuator on the basis of the output of the detection optical system such that the distance between the objective lens and the measured surface becomes equal to the focal length. Also, the linear scale disposed coaxially with the optical axis of the objective lens is unitarily attached to the actuator. Hence, the linear scale is moved in accordance with the displacement of the measured surface so that the displacement of the measured surface can be detected as the displacement of the linear scale with high accuracy.

Thus, the displacement of the measured surface can be measured with high accuracy by reading the graduation of this linear scale.

According to the second embodiment of the displacement detection apparatus of the present invention, since the optical detection system is moved in unison with the objective lens, the detection range of the displacement amount can be expanded.

Furthermore, according to the displacement detection apparatus of the present invention, since the origin is formed on the linear scale, the displacement amount can be detected with reference to the position of the origin.

A third embodiment of the displacement detection apparatus according to the present invention will be described hereinafter.

Figure 5:
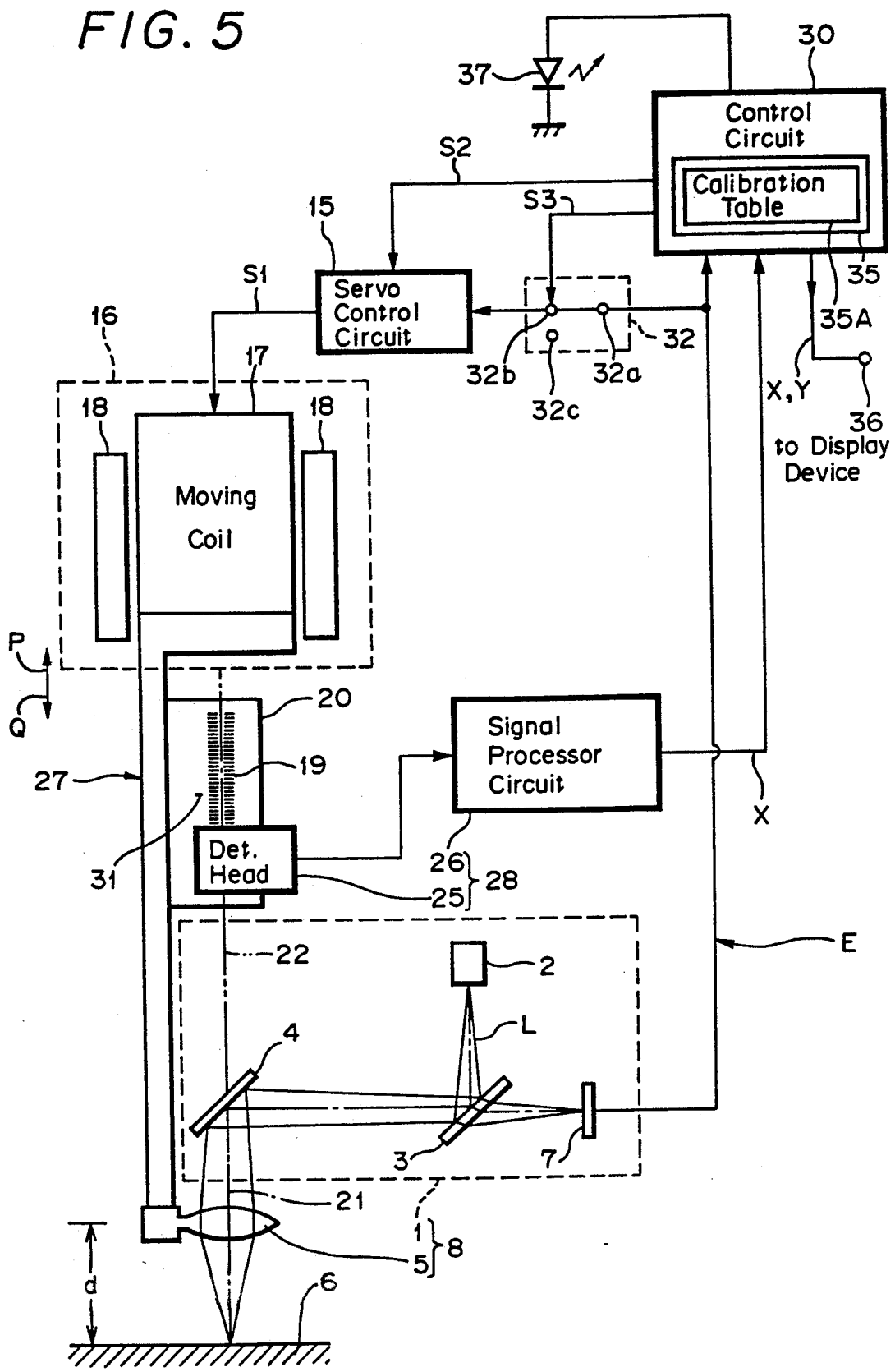
FIG. 5 is a block diagram showing an arrangement of a third embodiment of the displacement detecting apparatus according to the present invention.

FIG. 5 of the accompanying drawings shows the displacement detection apparatus according to a third embodiment of the present invention. In FIG. 5, like parts corresponding to those of FIGS. 1 and 4 are marked with the same references and therefore need not be described in detail.

Referring to FIG. 5, the detection optical system 1 for focusing error includes the laser diode 2. The laser light L emitted from the laser diode 2 is reflected on the beam splitter 3 and further reflected on the mirror 4, thereby the reflected laser light L being introduced into the objective lens 5 having the focal length f1.

In FIG. 5, the detection optical system 1 and the objective lens 5 constitute a non-contacting sensor 8. Incidentally, the non-contacting sensor 8 is not limited to the combination of the detection optical system 1 and the objective lens 5 and an electrostatic capacity type sensor, an STM or the like may be used as the non-contacting sensor 8.

The laser light L incident on the objective lens 5 is converged on the measured surface 6 by the objective lens 5. The reflected light reflected on the measured surface 6 is reflected by the mirror 4, traveled through the beam splitter 3 and then converged again on the quadrant diode 7 serving as the photo-detector.

As shown in FIG. 5, the focusing error signal E is supplied to a control circuit 30 and is also supplied a movable contact 32a and a fixed contact 32b of a switch 32 to the comparing circuit constructing the servo control circuit 15. The switch 32 is of a one-circuit and 2-contact switch and includes a non-contact fixed contact 32c. An on-off control signal S3 from the control circuit 30 is supplied to the movable contact 32a of the switch 32. On the basis of the level of the control signal S3, the movable contact 32a is switched to the fixed contact 32b side or to the non-contact fixed contact 32c side.

The servo control circuit 15 includes the comparing circuit and the servo amplifier (not shown) as described hereinbefore. A signal S2 is supplied to the servo amplifier from the control circuit 30.

When the switch 32 is connected as illustrated in FIG. 5 and the signal S2 is not supplied to the servo amplifier, i.e., under the condition that only the focusing error signal E is supplied to the input side of the servo control circuit 15, the servo control circuit 15 supplies the actuator 16 with the drive signal S1 which is the current signal for cancelling the focusing error signal E. The actuator 16 includes the moving coil 17, the permanent magnet 18 and the rod-shaped coupling member 27. One end portion of the moving coil 17 is fixed to one end portion of the coupling member 27, and the objective lens 5 is fixed to the other end portion of the coupling member 27.

The linear scale 20 having the graduation 19 is secured to the coupling member 27 at its predetermined position. The graduation 19 of the linear scale 20 is provided along the extension line 22 of the optical axis 21 of the objective lens 5. In other words, the linear scale 20 is disposed in line with the optical axis 21 of the objective lens 5. The linear scale 20 might be an optical scale (hologram scale) in which interference fringes of light, for example, are recorded as the graduation 19. Further, the optical scale may be replaced with a magnetic scale or capacity scale. Furthermore, it is preferable that the origin 31 is formed at substantially the central position of the graduation 19 in the linear scale 20.

The graduation 19 of the linear scale 20 is read by the detection head 25 secured to a chassis (not shown) or the like. The detection head 25 can be moved in the upper and lower direction of the extension line 22 of the optical axis 21, that is, in the direction shown by arrows P and Q and fixed to the chassis or the like at the position in which the detection head 25 is moved. The output signal from the detection head 25 is supplied through the signal processor circuit 26 to the control circuit 30 as a graduation read-out signal X. The detection head 25 and the signal processor circuit 26 constitute graduation read-out means 28.

The control circuit 30 is a microcomputer which includes a CPU, a ROM, a RAM (shown as a memory 35 in FIG. 5), an analog-to-digital (A/D) converter, a digital-to-analog (D/A) converter serving as an I/O interface or the like. The memory 35 includes a calibration table 35A. A method of forming the calibration table 35A will be described in detail later. If the memory read-out signal X is supplied to the control circuit 30 when the servo operation is turned off, i.e., the movable contact 32a of the switch 32 is connected to the fixed contact 32c, the control circuit 30 outputs a calibrated output signal(hereinafter referred to as calibrated data) Y corresponding to the memory read-out signal X with reference to a calibration table 35A. The calibration data Y is supplied through an output terminal 36 to a display device (not shown). Incidentally, the control circuit 30 derives the memory read-out signal X converted into a signal corresponding to the display device.

A light emitting element 37 such as a light emission diode or the like is connected to the control circuit 31 as a servo pull-in position detection lamp which will be described more fully later.

The above-mentioned detection optical system 1 might be coupled to the coupling member 27 so as to become movable together with the objective lens 5 or might be secured to the chassis (not shown).

Operation of the displacement detection apparatus according the third embodiment will be described with respect to the following two cases.

The first case relates to the case such that the displacement amount is detected while the servo is effected when the displacement is detected; and The second case is as follows: A calibration table is prepared beforehand and when the displacement is detected, the servo is not effected and the displacement amount is detected with reference to the calibration table. From this standpoint, the first case is the technique which assumes the present invention similar to the above first and second embodiments.

The first case (i.e., the displacement amount is detected even when the displacement is detected while the servo is being effected) will be described first.

Referring to FIG. 5, when the movable contact 32a and the fixed contact 32b are connected in the switch 32, i.e., under the condition that the servo can be pulled in, the servo control circuit 15 supplies the moving coil 17 of the actuator 16 with the drive signal S1 which can cancel the focusing error signal E. Thus, the feedback control is effected in such a manner that the distance d between the objective lens 5 unitarily attached to the coupling member 27 having the linear scale 20, and the moving coil 17 and the measured surface 6 may constantly become a value equal to the focal length f1 of the objective lens 5.

Thus, when the measured surface 6 is displaced, the objective lens 5 and the linear scale 20 are displaced in the same direction as the displaced direction of the measured surface 6 by the same length so as to keep the focal length f1 so that this displacement amount can be detected from the graduation 19 of the linear scale 20 by the detection head 25. Then, on the basis of the output signal from the detection head 25, the signal processor circuit 26 can calculate the displacement amount of the measured surface 6. The graduation read-out signal X provided as the calculated displacement amount is supplied through the control circuit 30 and a output terminal 36 and then displayed on the display device (not shown).

When the displacement amount of the measured surface 6 is detected under the condition that the servo is effected, Abbe error does not occur because the linear scale 20, which can move together with the objective lens 5, is disposed coaxially, i.e., in line with the optical axis 21 of the objective lens 5. For this reason, since the displacement amount of the linear scale 20 and the displacement amount of the objective lens 5 are made corresponding in a one-to-one relation, thereby making it possible to detect the displacement amount with high accuracy. However, since a detectable frequency under the condition that the servo is being effected, in other words, a detectable oscillation frequency of the measured surface 6 falls in a range of about DC~100 Hz, for higher oscillation frequency, the displacement amount of the linear scale 20 is caused to become a small value relative to the displacement amount of the measured surface 6 by the frequency characteristic of the servo system, resulting in a large measurement error.

From the first case, it is to be understood that, even when the focusing error signal E, which is the output signal of the detection optical system 1 forming the non-contact sensor 8, is poor in linearity, the displacement amount can be detected with high accuracy by reading the graduation 19 on the linear scale 20 while the servo is being effected. In actual practice, the linear scale 20 can provide a detection accuracy of about several nanometers to one hundred and several nanometers. The present invention can make effective use of this high detection accuracy as will be described below. Incidentally, the detection range (measurement range) of the displacement amount when the servo is being effected is up to about 10 mm.

The second case will be described next, in which case the calibration table is prepared in advance and when the displacement is detected, the displacement amount is detected with reference to the calibration table while the servo is not effected.

In the second case, when the switch 32 is not connected, i.e., the movable contact 32a is coupled to the non-contacting fixed contact 32c side in the switch 32 and the servo is not being effected, we have to pay attention to the following points.

When the measured surface 6 is oscillated (displaced) in the direction shown by arrows P and Q in a sine wave fashion as shown in FIG. 7A where the ordinate assumes a displacement amount and the abscissa assumes a time t, if the measured surface 6 has a relatively large reflectivity, then the focusing error signal E is clipped in level at its peak value to thereby provide a waveform shown in FIG. 7B. If on the other hand the reflectivity of the measured surface 6 is relatively small, then the amplitude of the focusing error signal E is reduced as shown in FIG. 7C. In both cases, since the servo is not effected, the waveform of the focusing error is poor in linearity.

To solve the above-mentioned problem, according to the third embodiment of the present invention, a calibration table 35A is prepared. This calibration table 35A is used to calibrate poor linearity of the focusing error signal E in response to an object to be measured (i.e., reflectivity of the measured surface 6) after the object to be measured is determined.

Figure 8:
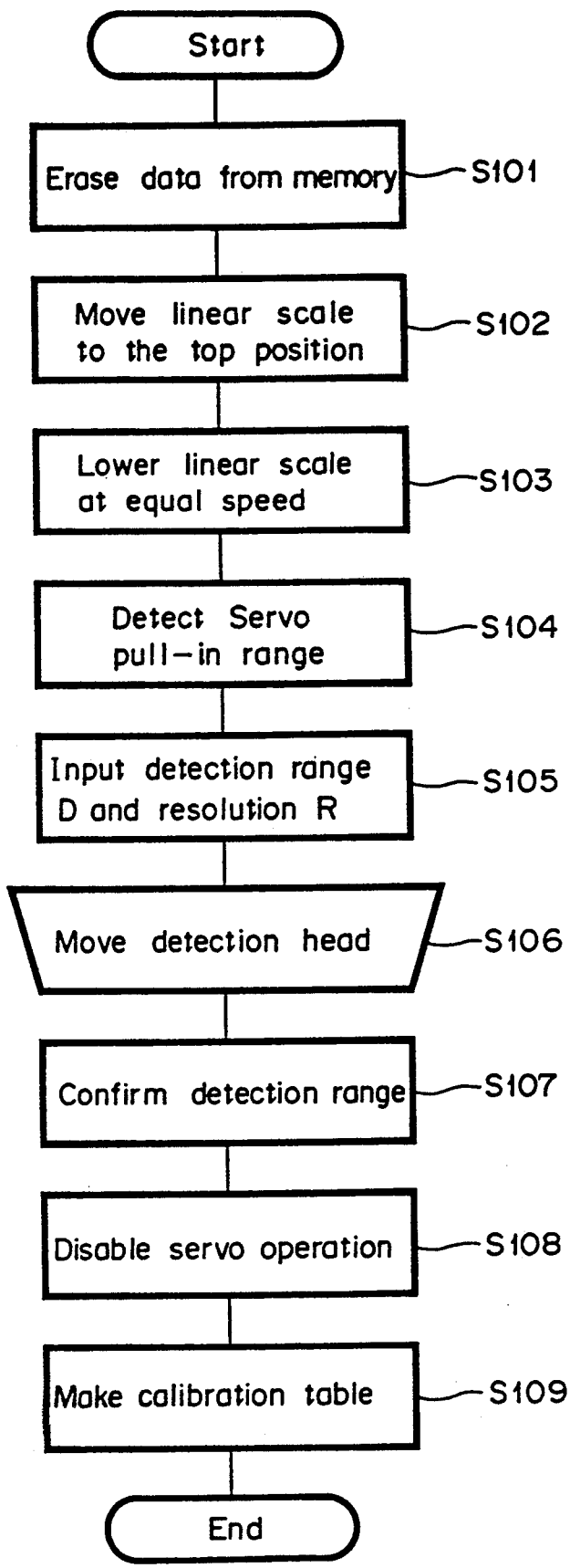
FIG. 8 is a flowchart to which references will be made in explaining a routine for making a calibration table.

FIG. 8 is a flowchart to which references will be made in explaining a routine for making the calibration table 35A.

When the calibration table 35A is formed, the displacement detecting apparatus is fundamentally set in the condition such that the servo is being effected, that is, the switch 32 is in the illustrated state of FIG. 5.

Referring to FIG. 8, following the Start of operation, data stored in a storage area kept as the calibration table 35A in the memory 35 is erased in step S101.

Then, the predetermined output signal S2 from the control circuit 30 is supplied to the servo amplifier (not shown) in the servo control circuit 15, whereby the moving coil 17, i.e., the linear scale 20 secured to the coupling member 27 or the like is moved to the end position of the arrow P direction (under the condition that the linear scale 20 is moved to the topmost position; topmost pull-in position) in step 102. Incidentally, the linear scale 20 unitarily fixed to the coupling member 27 is moved in the arrow P or Q direction in a proportional fashion (in a first order function fashion) in response to the level of the output signal S2 because the voice coil motor used as the actuator 16 is the motor which moves linearly relative to the current supplied to the moving coil 17.

In the next step 103, the signal S2 which urges the linear scale 20 to move downwardly at equal speed is supplied to the servo control circuit 15.

At that time, the light emitting element 37 coupled to the control circuit 30 is energized at the servo pull-in position. More specifically, if the light emitting element 37 is energized only at a properly-focused position (the position of the origin O and will hereinafter be referred to as "servo pull-in point O") of the servo pull-in range W (see FIG. 6), then the user can visually confirm the servo pull-in point O. Incidentally, in order to energize the light emitting element 37 at the servo pull-in point O, the change of a differential coefficient of the focusing error signal E is detected by the control circuit 30 to specify the servo pull-in range W and the light emitting element 37 is energized at a point in which the focusing error signal E is cancelled within the servo pull-in range W. In actual practice, the above-mentioned point has a small allowance.

When it is detected that the position of the objective lens 5 enters the servo pull-in range W, the value of the signal S2 output from the control circuit 30 is made zero in step 104.

In the next step 105, by using a keyboard (not shown) or the like, a detection range D which covers the displacement range of the measured surface 6 and a detection resolution R are input to the control circuit 30. By way of example, the detection range D is selected as $D = \pm 1$ $\mu$m and the resolution R is selected as $R = 0.02$ $\mu$m. From the detection range D and the resolution R, it is to be understood that data number N within the detection range D becomes 100 (N=100).

In the next step 106, the detection head 25 is moved in the arrow P or Q direction and then fixed to the position of the origin 31 of the linear scale 20. The position of the origin 31 can be specified by the graduation detection signal X.

At that time, by moving the detection head 25 from the origin 31 upwardly and downwardly, it can be confirmed on the basis of the graduation read-out signal X whether or not the measured surface 6 lies within a range which can cover the above detection range D in step 107. If the measured surface 6 is out of the range which cannot cover the detection range D, then the measured surface 6 or the entirety of the displacement detecting apparatus shown in FIG. 5 must be moved to the range which can cover the detection range D. According to the third embodiment of the present invention, the detection range of about ±20 μm can be covered.

In the next step S108, the movable contact 32a of the switch 32 is switched from the fixed contact 32b to the non-contacting fixed contact 32c side in response to the control signal S3, thereby releasing the servo operation. At that time, the servo control circuit 15 is supplied with the control signal S2 which causes the graduation read-out signal X read out by the detection head 25 to take a value representative of the position of the origin 31 of the linear scale 20.

Figure 9A:
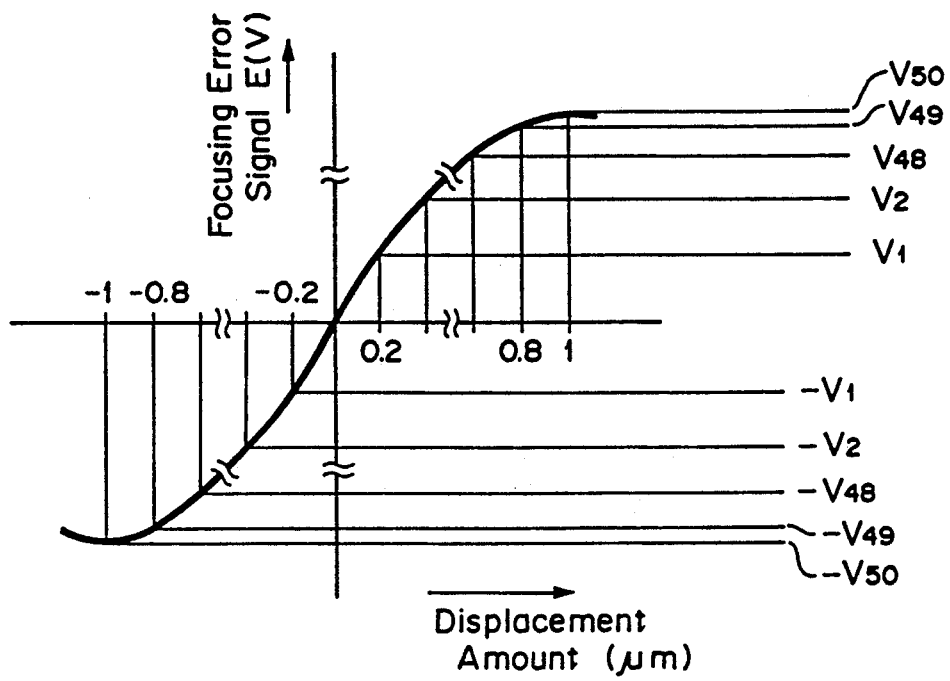
FIG. 9A is a diagram showing the process of making the calibration table used in the present invention.

Then, the control signal S2 is changed from this state such that the objective lens 5 is moved in a stepwise fashion satisfying resolution R=0.02 μm within the detection range D=±1 μm (in this case, the stepwise movement of 0.02 μm can be accurately set by reading out the graduation read-out signal X) and the value of the focusing error signal E is analog-to-digital converted to provide digital data (digital data which results from converting voltage −50V Volts into +V50 Volts in an A/D conversion manner in FIG. 9A). Further, the graduation read-out signal X (this graduation read-out signal X is referred to as "calibration data Y), provided when the digital data (voltage value of the focusing error signal E), is stored in the control circuit 30 in response to the above-mentioned digital data, thereby forming the calibration table 35A.

Figure 9B:
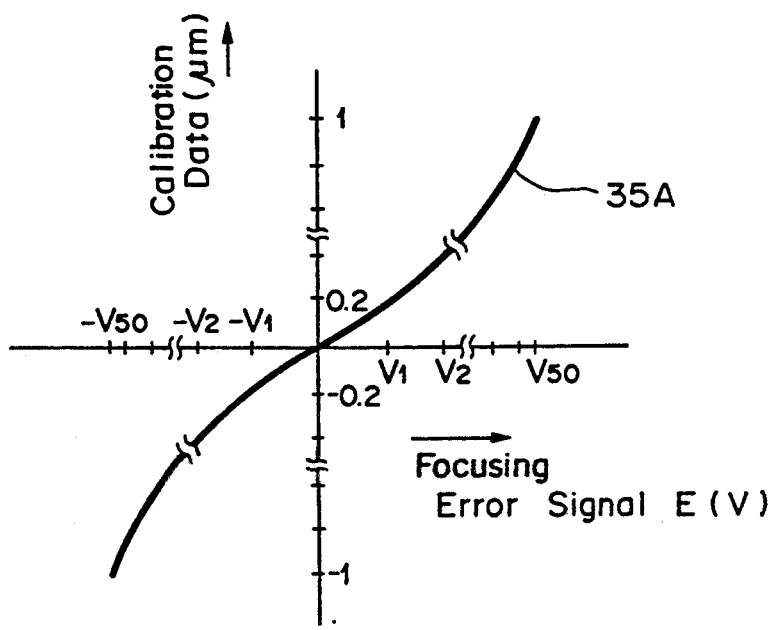
FIG. 9B is a diagram showing an example of the calibration table used in the present invention.

Consequently, the calibration table 35A becomes a table on which there are plotted the calibration data Y representative of the displacement amount (μm) which is calibrated by the linear scale 20 of relatively high accuracy relative to the voltage values ±V1 to V50 of the focusing error signal E as shown in FIG. 9B.

When the displacement amount is detected in actual practice, the servo operation is disabled, i.e., the movable contact 32a of the switch 32 is connected to the non-contacting fixed contact 32c side and the coupling member 27 is fixed to the chassis (not shown) at a timing point in which the value of the focusing error signal E is at zero Volt. In this case, the objective lens 5 also is fixed.

Under the above-mentioned condition, the voltage change of the focusing error signal E caused by the vibration of the measured surface 6 is converted into digital data in a real time fashion by the control circuit 30. Then, the calibration table 35A (see FIG. 9B) is checked by the digital data thus converted, whereby the displacement amount calibrated by the linear scale 20 of high accuracy can be detected in a real time fashion. Incidentally, a time during which the voltage change of the focusing error signal E is converted in the form of analog to digital data and the calibration table 35A is checked might be a time of about 100 μs. Thus, according to this embodiment, insofar as the oscillation frequency of the measured surface 6 falls in a range up to about 10 kHz, the displacement amount of the measured surface 6 can be detected with high accuracy.

Hence, according to the displacement detecting apparatus of the third embodiment shown in FIG. 5, the displacement amount can be detected with accuracy of resolution nm (≑0.005 μm) under the condition that the servo is effected and the displacement amount is ±5 mm and the detectable frequency is 100 Hz and under the condition that the servo is not effected and that the displacement amount is ±10 μm and that the detectable frequency is 10 kHz.

As described above, according to the displacement detection apparatus of the present invention, the control circuit includes the calibration table in which the output signal of the non-contacting sensor is calibrated by the output signal from the graduation read-out means for reading out the graduation of the linear scale. Thus, when the displacement of the measured surface is detected (i.e., measured), the servo is not effected and the calibrated output signal corresponding to the output signal of the non-contacting sensor is output from the calibration table, whereby the displacement of the measured surface can be detected with high accuracy and at high speed.

Having described preferred embodiments of the invention with reference to the accompanying drawings, it is to be understood that the invention is not limited to those precise embodiments and that various changes and modifications could be effected by one skilled in the art without departing from the spirit or scope of the novel concepts of the invention as defined in the appended claims.

What is claimed is:

1. A displacement detecting apparatus comprising:
   (a) a non-contacting sensor for detecting a displacement of a measured surface;
   (b) a linear scale unitarily attached to said non-contacting sensor through a coupling member;
   (c) graduation read-out means for reading out a graduation of said linear scale;
   (d) an actuator for moving said non-contacting sensor and said linear scale; and
   (e) a servo control circuit for driving said actuator, wherein said linear scale and said non-contacting sensor are moved by said actuator in unison with each other.

2. The displacement detecting apparatus according to claim 1, in which said non-contacting sensor is composed of an objective lens for converging a laser light on said measured surface and a detection optical system for detecting a displacement of a distance between said objective lens and said measured surface on the basis of a reflected light reflected on said measured surface.

3. The displacement detecting apparatus according to claim 2, in which the graduation of said linear scale is disposed in line with an optical axis of said objective lens.

4. The displacement detecting apparatus according to claim 3, in which said actuator moves said objective lens in the optical axis direction on the basis of an output from said optical detection system such that the distance between said objective lens and said measured surface becomes equal to a focal length of said objective lens.

5. The displacement detecting apparatus according to claim 4, in which said objective lens is moved in unison with said linear scale which is unitarily attached thereto through said coupling member.

6. The displacement detecting apparatus according to claim 5, in which said detection optical system is moved in unison with said objective lens.

7. The displacement detecting apparatus according to any of preceding claims 1, 2, 3, 4 or 5, in which said linear scale has an origin formed thereon.

8. The displacement detecting apparatus according to any of preceding claims 1, 2, 3, 4 or 5, further comprising a control circuit supplied with output signals from said non-contacting sensor and said graduation read-out means and said control circuit includes therein a calibration table in which the output signal from said non-contacting sensor is calibrated by the output signal from said graduation read-out means.

* * * * *